(12) United States Patent
Silva et al.

(10) Patent No.: US 10,355,877 B2
(45) Date of Patent: Jul. 16, 2019

(54) KIOSK DEVICE MANAGEMENT IN QUICK SERVICE RESTAURANT ENVIRONMENTS

(75) Inventors: John Edward Silva, San Diego, CA (US); Suzanne Grace Arena, San Diego, CA (US); Anthony J. K. Kua, San Diego, CA (US)

(73) Assignee: Tillster, Inc., San Diego, CA (US)

( * ) Notice: Subject to any disclaimer, the term of this patent is extended or adjusted under 35 U.S.C. 154(b) by 2778 days.

(21) Appl. No.: 12/391,140

(22) Filed: Feb. 23, 2009

(65) Prior Publication Data
US 2010/0217892 A1 Aug. 26, 2010

(51) Int. Cl.
*G06F 13/10* (2006.01)
*H04L 12/403* (2006.01)
*G06F 9/4401* (2018.01)

(52) U.S. Cl.
CPC .......... *H04L 12/403* (2013.01); *G06F 9/4413* (2013.01)

(58) Field of Classification Search
None
See application file for complete search history.

(56) References Cited

U.S. PATENT DOCUMENTS

| | | | | |
|---|---|---|---|---|
| 5,819,107 A * | 10/1998 | Lichtman et al. | ............... | 710/8 |
| 6,886,050 B2 * | 4/2005 | Takamizawa et al. | ........... | 710/8 |
| 2003/0163388 A1 * | 8/2003 | Beane | .................... | G06Q 20/04 |
| | | | | 705/26.1 |
| 2004/0210498 A1 * | 10/2004 | Freund | ............................. | 705/30 |
| 2006/0073887 A1 * | 4/2006 | Nguyen et al. | ................. | 463/27 |
| 2006/0080175 A1 * | 4/2006 | Rowe et al. | .................... | 705/14 |
| 2006/0133392 A1 * | 6/2006 | Ajitomi | ............... | H04L 12/2803 |
| | | | | 370/401 |
| 2006/0139690 A1 * | 6/2006 | Yagita | ................... | G06F 3/1204 |
| | | | | 358/1.15 |
| 2007/0204166 A1 * | 8/2007 | Tome et al. | .................... | 713/182 |
| 2008/0182644 A1 * | 7/2008 | Lutnick et al. | ................. | 463/20 |
| 2009/0159661 A1 * | 6/2009 | Sanches | ................. | G06Q 40/00 |
| | | | | 235/379 |
| 2009/0199044 A1 * | 8/2009 | Hurrell | ..................... | G07F 9/02 |
| | | | | 714/23 |

OTHER PUBLICATIONS

"RFC 1422", Author: S. Kent, Publisher: Network Working Group, Publishing Date: Feb. 1993; Relevant page(s): [p. 28]; Access: http://tools.ietf.org/html/rfc1422 on Jun. 15, 2011.*

* cited by examiner

*Primary Examiner* — Ilwood Park
(74) *Attorney, Agent, or Firm* — Knobbe, Martens, Olson & Bear, LLP (57) ABSTRACT

A kiosk system which is capable of maintaining kiosk devices online without physical manipulation is disclosed. The kiosk system capable of forcing a programmatic re-initialization of kiosk devices when necessary. Individual devices in the kiosk system can be initialized and re-initialized in parallel with normal operation of the kiosk system.

22 Claims, 11 Drawing Sheets

KIOSK DEVICE MANAGEMENT IN QUICK SERVICE RESTAURANT ENVIRONMENTS

BACKGROUND OF THE INVENTION

Field of the Invention

This application relates to customer-operated kiosks in quick service restaurant environments. In particular, this application relates to systems and methods for providing kiosk device management for kiosk devices connected to such kiosks.

Description of Related Technology

Existing customer-operated kiosk systems typically integrate various peripheral devices in order to provide customer ordering services in a quick service restaurant environment. In many cases, these devices may be encapsulated within the interior of the kiosk device and hidden from external view resulting in difficulty in detecting and correcting problems. Because failure of certain internal device components may cause the kiosk system to fail or otherwise adversely impact customer experience, improved kiosk systems are needed.

SUMMARY OF CERTAIN INVENTIVE ASPECTS

The system, method, and devices of the invention each have several aspects, no single one of which is solely responsible for its desirable attributes. Without limiting the scope of this invention, several of its features will now be discussed briefly.

In one aspect, there is a kiosk device management system. The kiosk device management system includes a device discovery module configured to discover a kiosk device connected to a kiosk computer and report the discovered kiosk device. The system also include an event bus configured to receive a notification related to the discovered kiosk device from the device discovery module. A model registry is configured to receive information indicative of the discovered device from the event bus and generate a device model based on the received information. The system also includes a device management module configured to receive status codes from the discovered device and send a command to the discovered device based on the received status code.

In another aspect, there is a method of managing kiosk devices in a kiosk system. The method includes discovering a plurality of kiosk devices connected to a kiosk computer and reporting information related to each of the plurality discovered devices to an event bus. The event bus then transmits the information related to each of the plurality of discovered devices to a model registry. A plurality of device models is generated which corresponds to each of the plurality of discovered devices based at least in part on the information related to each of the plurality of discovered devices.

In yet another aspect, there is a method of providing device management services in a kiosk system. The kiosk system has a kiosk application that provides a customer-operated quick service restaurant ordering interface. The method includes receiving a first device status code in a model registry of the kiosk system, the device status code comprising data indicative of a kiosk device failure condition. The method further includes storing the first status code as current status data for a device model corresponding to the kiosk device in the failure condition and issuing a command for the kiosk application to enter a lower function mode based at least in part on the first status code. Lastly, the method includes generating a re-initialization command for the failing kiosk device; and transmitting the re-initialization command to the failing kiosk device.

BRIEF DESCRIPTION OF THE DRAWINGS

In this description, reference is made to the drawings wherein like parts are designated with like numerals throughout.

DETAILED DESCRIPTION OF CERTAIN INVENTIVE EMBODIMENTS

Various embodiments disclosed herein relate to systems and methods for providing autonomic device management for customer-operated ordering kiosks which are operated in quick service restaurant environments.

Issues of reliability and performance have prevented wide-scale adoption of customer-operated ordering kiosks in quick service restaurant (QSR) environments. The QSR environment is fast-paced, and the large majority of customers and therefore revenues are serviced during a few peak mealtime hours each day. The customer-operating ordering kiosks installed in QSR environments typically include internal software running on a computer. The computer, in turn, may be connected to other kiosk devices such as computer peripheral devices, for example which provide services to the kiosk application. For example, the kiosk computer may be connected to a printer which is used to print customer receipts from the ordering kiosk.

Although peripheral devices in the kiosk are often important to the optimal operation of the kiosk, they are not in some cases absolutely necessary for the kiosk to operate. Nevertheless, failure of a kiosk device during a peak mealtime such as during the lunch hour, can have a significant effect on the profitability for a particular day. Existing kiosk devices have been problematic because they have commonly encountered problems which require system maintenance during the times that they are most heavily used. These problems have included untimely failure of kiosk devices such as receipt printers, credit card processing, cash handling, and the like. Additionally, because kiosk devices are typically located in a secured interior portion of the kiosk, and are often placed in environments which allow limited hours of serviceability, when a kiosk device fails it is difficult to remedy the failure for several hours due to these issues of security, location, error detection, or interruption of customer experience.

The inventors have also recognized that existing QSR kiosk solutions have also suffered from offering inflexible software support for the variety of kiosk devices that may be installed or operated within the kiosks. Kiosk devices used within the kiosks are often specialized in nature, and therefore, may be manufactured in relatively small batches. When kiosk devices fail, they may need to be replaced by new kiosk devices. Manufacturing kiosk devices in small batches can lead to small variances in physical hardware attributes as well as subtle differences in device firmware which may manifest during certain error scenarios. As a result, the behavior of a replacement device and its device specific error codes may not always be fully known before the replacement device is sent into the field.

Kiosk systems in the field, particularly when unmanned, may be subjected to abusive behavior such as jarring, blocking of printer output areas, and accidental static discharge which can temporality render the printer and other kiosk devices unavailable for a small number of transactions. These situations may resolve themselves naturally within minutes (or even seconds), but in ordinary circumstances, the kiosk application running on the kiosk computer may not be aware that the situation has been resolved and thus may not resume its normal interface and communication with the kiosk device. Thus, a re-initialization of the kiosk system may be required to restore full functionality. Because initialization of the kiosk system may involve starting and initialization many kiosk devices, a re-initialization can take several minutes to complete.

In order to address the operating challenges described above, the inventors have developed a kiosk system which is capable of maintaining kiosk devices online without physical manipulation, and is further capable of forcing a programmatic re-initialization of kiosk devices when necessary. Moreover, because complete initialization of a kiosk system is such a time consuming event, the inventors have developed a kiosk system in which individual devices can be initialized and re-initialized in parallel with normal operation of the kiosk system.

Figure 1:
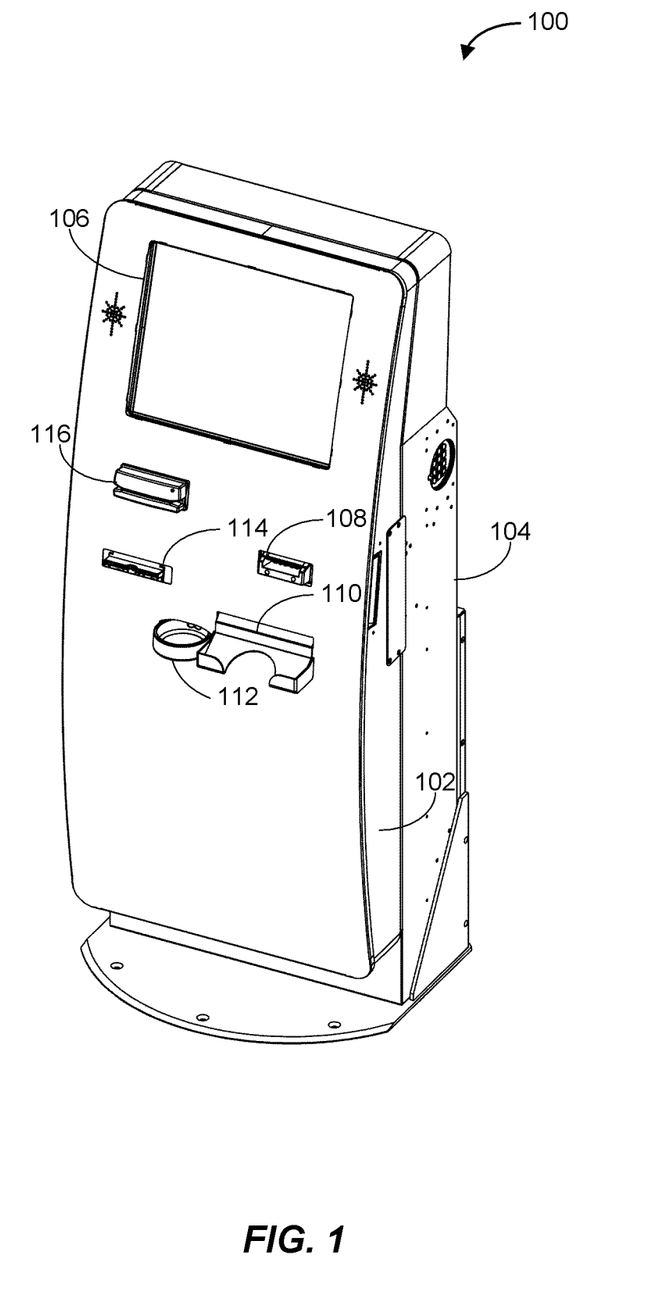
FIG. 1 is an example of a customer-operated kiosk device suitable for implementation of one or more embodiments disclosed herein.

Turning now to FIG. 1, an example of a kiosk 100 is provided. The example provided in FIG. 1 is a plan view of the exterior of the kiosk 100. The kiosk 100 includes a kiosk door 102. The kiosk door 102 may be attached to a kiosk body 104 by hinges or some other connecting mechanism. The kiosk door 102 may be opened to expose the interior cabinet of the kiosk 100. The kiosk door 102 may be secured by a locking mechanism to prevent access to the interior cabinet of the kiosk 100 by unauthorized individuals. The kiosk body 104 together with the kiosk door 102 may cooperatively form a hollow enclosure which is typically referred to as the kiosk cabinet or kiosk housing. Many of the kiosk devices which provide services to the kiosk application are located within the kiosk cabinet or housing.

The kiosk door 102 may have cutout areas forming apertures through which limited access may be provided to internal kiosk device components. For example, one aperture in the kiosk door may provide access to a kiosk display 106. The kiosk display 106 may be a touch screen display that may be used by the customer to operate a kiosk software application. The kiosk software application may be stored in a memory on a kiosk computer (not shown) which is positioned in the kiosk cabinet and generally not accessible without first opening the kiosk door 102. Another aperture in the kiosk door 102 may provide access to a bill accepting device 108. The bill accepting device 108 may be used to receive payments in the form of cash or some other paper currency or note for services rendered. The bill accepting device 108 may form a part of a larger cash handling subsystem which also includes a cash dispenser 110 and a coin dispenser 112. As shown in FIG. 1, certain portions of the cash dispenser 110 and the coin dispenser 112 are made accessible to the customer via additional apertures formed in the kiosk door.

Because the kiosk 100 is configured to conduct business transactions, the kiosk 100 may be configured with a printing device 114. The printing device 114 may be a specialized receipt printer which is connected to the kiosk computer and which prints receipts to customers in accordance with kiosk application requirements. The receipt printing device may be positioned predominantly within the kiosk cabinet as shown, with only the paper output area protruding through an aperture formed in the exterior of the kiosk 100. Also part of the payment subsystem in the kiosk may be a credit card processing device 116. In the example shown in Figure, a portion of the credit card processing device 116 extends through an aperture to receive a credit card (or other type of card) swipe from the customer.

All of the devices described above merely illustrate some of the kiosk devices which may be located within the interior portion of the kiosk 100. As a skilled artisan will readily appreciate, the kiosk 100 may include many other different kiosk devices and may be configured in various other ways. For example, the kiosk door may be located on the back side of the kiosk 100 instead of the front side, and the apertures may be formed within the kiosk body 104 instead of within the kiosk door 102. Further, the relative locations of the various kiosk devices need not necessarily be provide as shown in FIG. 1, and the example provided there is merely illustrative of one possible kiosk suitable for implementation of the device management techniques disclosed herein.

As discussed above, the kiosk 100 may be use a computing device or computer which is connected to various other kiosk devices to perform the ordering functions assigned to the kiosk 100. The computing device may be a specialized computer which is designed specifically for kiosk operations, or in some embodiments, the computer may be a standard personal computer device such as an Intel processor-based PC running an off the shelf operating system such as Windows, Linux, MacOS, or the like. As used herein, the term "computing device" or "kiosk computer" generally refers to one or more computers which are connected to kiosk devices to control the operation of kiosk. The term "kiosk system" refers to both the computing device and the kiosk devices that are connected to it. The kiosk devices may be computer peripheral devices such as the kiosk printer 114, the kiosk display 106, the kiosk bill collector 108, the bill dispenser 110, the coin dispenser 112, or other types kiosk devices. A "kiosk application" refers to one or more software applications executing on the kiosk computer which provide the user interface for the kiosk and its other operations.

Figure 2:
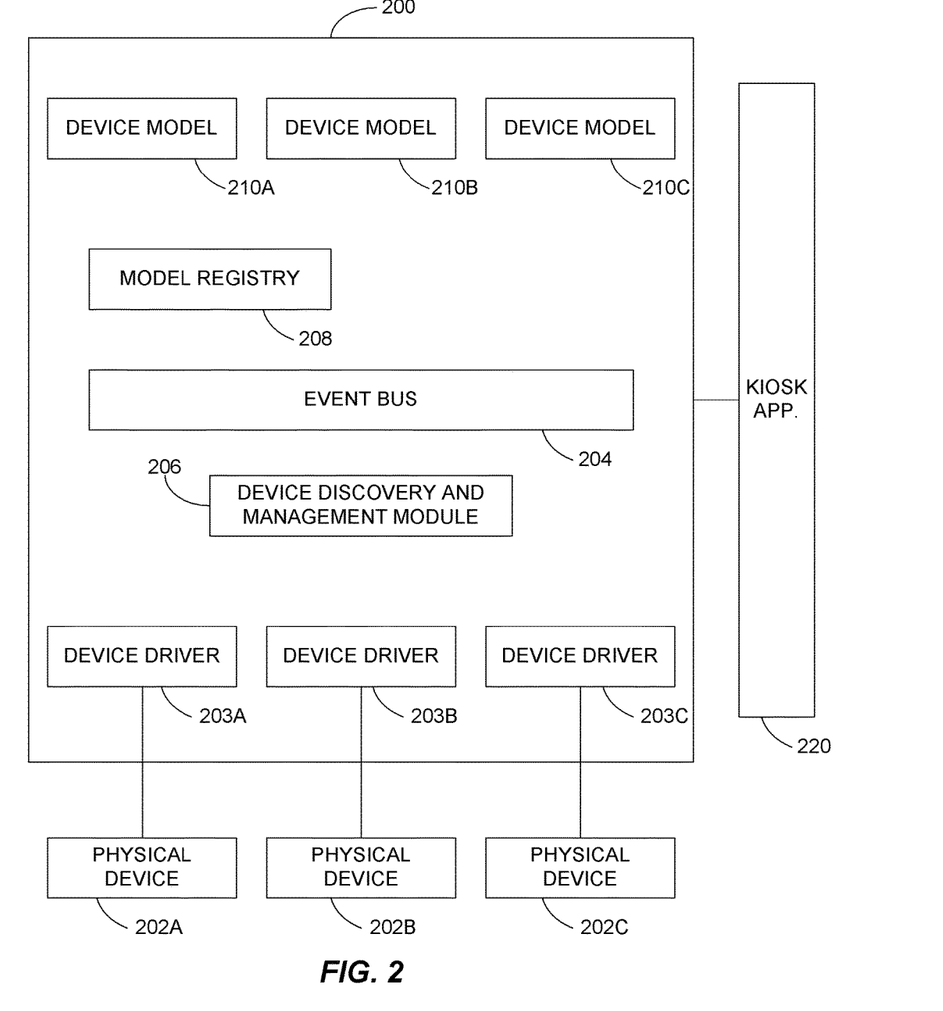
FIG. 2 is a block diagram illustrating one example of a kiosk device management system implemented within the kiosk shown in FIG. 1.

FIG. 2 is a block diagram illustrating one example of the logical components of a kiosk device management system 200 that may be implemented within the kiosk system discussed above. The kiosk device management system 200 generally includes hardware and software which enables the kiosk system to address device failures in such a way as to minimize the impact on the customer's experience. As shown in the figure, there are various kiosk devices 202A, 202B, and 202C which may be managed by the device management system 200 and are accessed by the kiosk device management system 200 via one or more device drivers 203A, 203B, and 203C which may be installed in the operating system of the kiosk computer. In one embodiment, the kiosk device 202A may be a receipt printer, device 202B may be a credit card processor, and 202C may be a cash handling device. In addition, a kiosk application 220 also may be present and communicating with the kiosk device management system 200. The kiosk application 220 may communicate with the kiosk device management system 200 by sending and receiving messages from an event bus 204. Although the kiosk application is shown as existing outside of the kiosk device management system 200, a skilled artisan should appreciate that the kiosk application 220 may run on the same kiosk computer as the kiosk device management system 200. Moreover, is some embodiments, the kiosk device management system may actually be a subcomponent of the kiosk application 220.

As noted above, the kiosk device management system 200 may include an event bus 204. The event bus 204, which may take the form of a software module or service, typically receives and delivers messages to other components in the kiosk device management system 200. As part of the kiosk device management system 200, the event bus is typically used to reliably transmit information about the existence or health of kiosk devices 202 to other subsystems in the kiosk device management system 200 or to the kiosk application 220. In one embodiment, the event bus operates according to a publish and subscribe model which provides asynchronous messaging services. Additional details about the event bus 204 are discussed below in connection with FIG. 4.

The kiosk device management system 200 may also include a device discovery and management module 206. The device discovery and management module 206 typically takes the form of a software service and performs two general functions: device discovery and device management. Although the embodiment described in FIG. 2 shows both of these functions as being integrated into a single module, a skilled artisan will appreciate that the two functions may also be provided by two separate modules, one directed to device discovery and the other directed to device management. Discovered devices may be managed by the device management module. The device management module may receive remote procedure calls from the event bus 204 (which may be originated in the kiosk application 220) and routes them to the attached devices.

With respect to device discovery, the software service may be configured to discover kiosk devices which are attached to the kiosk computer, or are otherwise part of the kiosk system. Typically, these kiosk devices are attached via a direct hardware interface such as a printer port on the kiosk computer, a USB port, an RS232 interface, and IP network interface (wired or wireless), or some other type of connection. In some embodiments, the discovery of the kiosk devices may be achieved using various device discovery techniques. For example, the device discovery module may be configured to read a configuration file stored in a memory of the kiosk computer which contains information about connected devices, including information related to prioritization of resources. The device discovery module may also be configured to scan known device locations in the operating system of the kiosk computer to determine which kiosk devices are connected to the kiosk computer and working properly. These known device locations may include certain ports (both physical and virtual), or these location may also include registry information which is indicative of the status of the ports. For kiosk devices which are available to the kiosk computer via a network connection, the discovery module may be configured to access simple network management protocol (SNMP) information to discover network-connected kiosk devices. In addition, the discovery module may access Universal Plug and Play (UPnP) information from the kiosk computer which provides additional details about connected devices. Other methods of kiosk device discovery may be used such as java messaging services (JMS) for example.

Once the discovery module 206 discovers kiosk devices, it is typically configured to report the discovered device to the event bus 204. The event bus 204, in turn, may pass the device discovery message to the model registry 208. The model registry 208 is a software component or module which is configured to create and manage device models 210. Device models 210 are abstractions of the physical devices 202 which are discovered by the discovery and management module 206 and will be discussed in greater detail below. The model registry 208 receives information from the event bus 204 and generates a "best-fit" device model 210 for the physical device 202 using existing property comparison algorithms. The property comparison algorithms typically allow the kiosk system to select non-optimal kiosk devices to carry out certain requests. For example, a kiosk application may request a printer which is capable of printing in color, and landscape layout. The model registry would then iterate through its discovered devices and find if any are capable of performing such print jobs. If none exists, it may loosen its requirements and query for a less capable, but still acceptable device. Other property comparison algorithms may be used in a situation whether the kiosk requests a printer capable of printing receipts (in the standard format). If one is unavailable, the algorithms may allow the kiosk to settle for a standard laser printer which is also attached to the kiosk. As shown in FIG. 2, the model registry 208 may generate a device model (210A, 210B, 210C) which corresponds to each physical device (202A, 202B, 202C) discovered by the device discovery and management module 204.

As noted briefly above, the device models 210 are software modules or components which abstract certain details about the physical device 202 to which they correspond. These abstracted details may include the serial number of the device 202, the device manufacturer, the device model, capabilities of the device, or some other information. The abstracted information is made available to the kiosk application 220 so that the device may be accessed by the kiosk application 220 in a generic manner without needing low level device programming incorporated into the kiosk application logic.

The kiosk device management system 200 shown in FIG. 2 generally operates continuously while the kiosk system is active. As will be described in more detail below in connection with FIGS. 7-12, the device discovery and management module 204 may be configured to regularly check the kiosk system for new devices and may be further configured to monitor the discovered devices for the status codes and messages via the device driver 203 associated with each respective physical device 202. The status codes are reported across the event bus 204, where they are picked up by the model registry and incorporated into the appropriate model. If inactivity in a device 202 is detected by the management module 206, or if a known error code is encountered, the management module may be configured to send a re-initialization command to the device 202.

Figure 3:
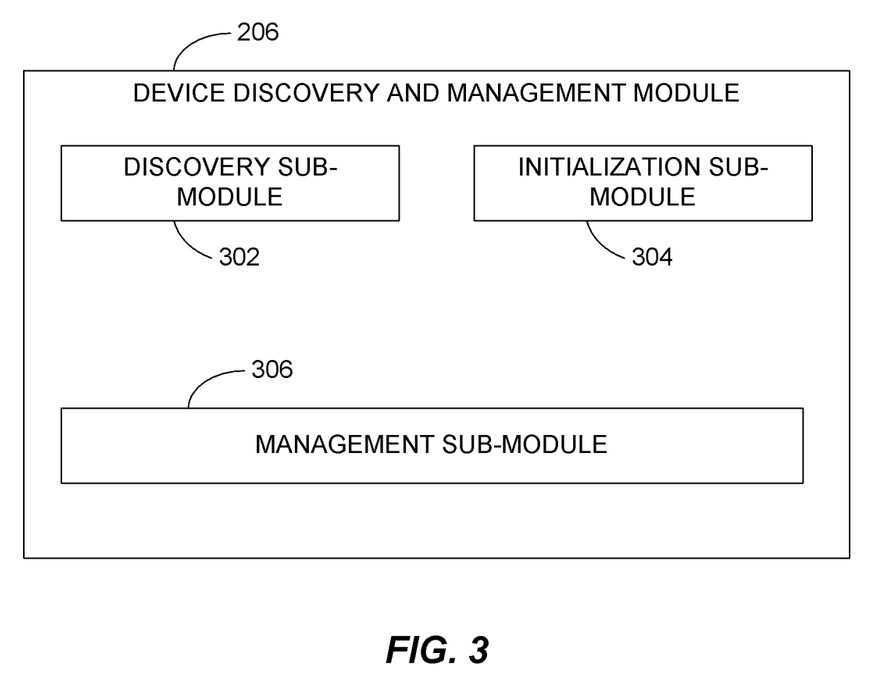
FIG. 3 is a more detailed view of the device discovery and management module shown in FIG. 2.

FIG. 3 is a more detailed view of the device discovery and management module 206 shown in FIG. 2. As shown, the discovery and management module 206 may include various sub-modules and/or subcomponents. The discovery and management module 206 may contain a discovery sub-module 302. The discovery sub-module 302 typically comprises one or more functions, methods, or even classes which may be used to identify the physical devices 202 which are connected to the kiosk computer and therefore part of the kiosk system. As noted above, the kiosk device management system 200 may be configured to continuously monitor the kiosk system for new kiosk devices.

Also included in the device discovery and management module 206 is an initialization sub-module 304. The initialization sub-module 304 incorporated into the discovery and management module 206 typically includes initialization commands for the devices that have been discovered by the discovery sub-module 302. The initialization sub-module 306 is typically used in two circumstances. First, the initialization logic is called for the purpose of sending initialization commands to kiosk devices during the startup process of the kiosk system. Second, the initialization logic may also be used to attempt to re-initialization devices which have become inactive or have reported error conditions which require a restart of the device.

The device discovery and management module 206 also includes a management sub-module 308. The management sub-module 308 includes functions and methods which may query discovered devices 202 via their associated device driver 203 for the current status of the device 202. The management logic may also receive messages/command from the event bus 204 which are intended for a device and send those messages/commands to the device via the device driver. For example, in one embodiment, if the kiosk application makes a print request to a printer device model such as device model 210A, the model registry 208 passes that print request to the event bus 204 which in turn delivers to message to the device management module 206. Alternatively, the kiosks requests may be issued directly to the device model 210 and then sent directly to the device management module 206, or even the device subsystem the model represents. The device management module 206 then converts the command into the machine-understandable print code and sends the code to the appropriate driver 203A. The device driver 203A may then pass the code to the printing device 202A which then executes the print command in the printing hardware.

Figure 4:
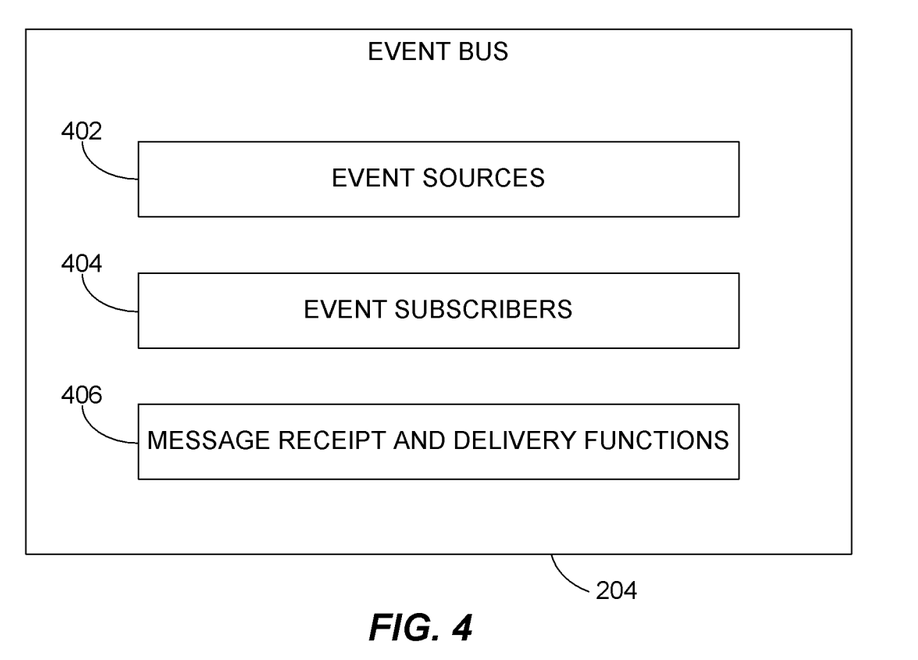
FIG. 4 is a more detailed view of the event bus shown in FIG. 2.

FIG. 4 is a more detailed view of the event bus 204 shown in FIG. 2. As noted previously, the event bus 204 may take the form of a publish and subscribe model event bus. In the embodiments shown in FIG. 4, the event bus 204 includes one or more event sources 402 and event subscribers 404. The event sources 402 may take the form of a table of subsystems in the kiosk device management system 200 known to pass messages to the event bus. The event sources may serve as publishers in publish and subscribe models. The event subscribers 404 include devices, components, processes, and models which have subscribed for event notifications from the event bus. The event bus may also include various message receipt and delivery functions 406 which handle the actual message passing by the event bus.

Figure 5:
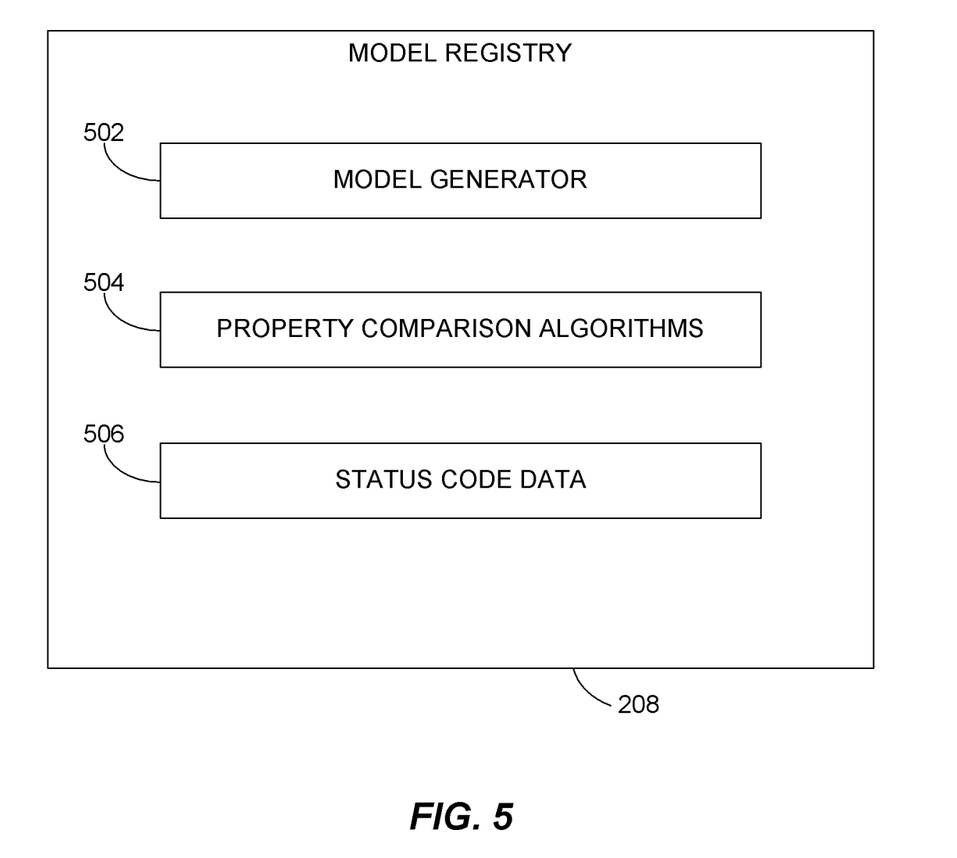
FIG. 5 is a more detailed view of the model registry shown in FIG. 2.

Turning now to FIG. 5, a more detailed view of the model registry is provided. As shown, the model registry may include a model generator 502. The model generator 502 receives information from the event bus 204 and generates device models 210 based on the received information. The model registry 208 may also include one or more property comparison algorithms which may be used by the model generator 502 to generate a device model 210 which accurately reflects (and abstracts) the capabilities of the device 202 being modeled. As noted previously, property comparison algorithms property comparisons may compare the kiosk requested properties/capabilities of the kiosk device with the actual properties/capabilities of the device to find a best match. The model registry 208 may further include status code data 506. The status code data 506 may take the form of a table of known status codes for devices that have been discovered in the kiosk system. The status code data may be used by the model registry to interpret codes enclosed in messages received from the event bus 204. In some instances, unknown codes may be received by the model registry. These codes may also be stored in the status code data 506 and later interpreted based on testing and other information provided by the device model 210 associated with the unknown codes.

In certain embodiments, the model registry 208 may be configured to store a list of discovered models and organize them into general device types (such as bill acceptor, printer, for example). The device models 210 may also model external systems, such as point of sale systems, or external credit card processors, for example.

When the model registry receives a status message, it compares the message source to its existing device models 210, and if there is a new device reporting, the model generator 502 may generate a new model for device sending the message, based on the information the device has given. In some embodiments, the capabilities of a device may be listed in a separate repository instead of being directly reported by the device to the event bus 204. For example, a device may simply report that it is a SWECOIN 2030 device. From that reporting message, another repository of information may be accessed to determine that device is a printer with 300 dpi, black and white toner and a 3 cm paper roll.

Figure 6:
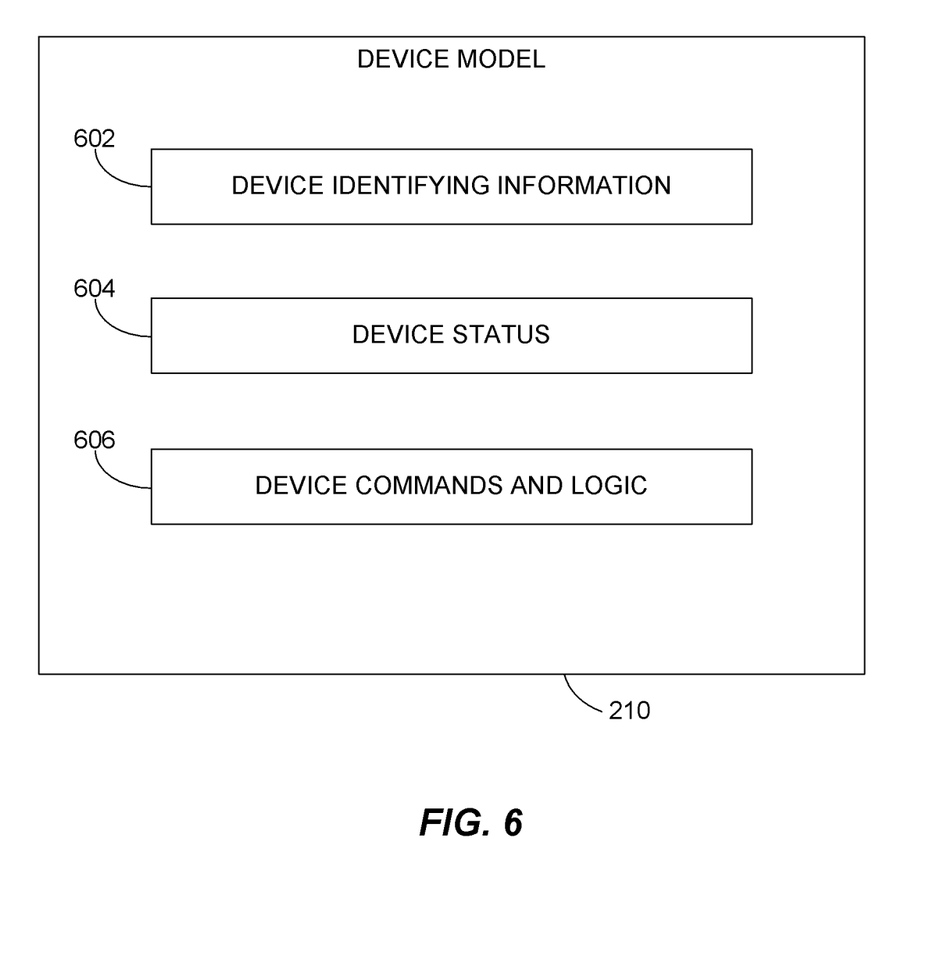
FIG. 6 is a more detailed view of a device model shown in FIG. 2.

FIG. 6 is a more detailed view of the device model 210 shown in FIG. 2. As discussed above, a device model 210 is an abstraction of a physical device 202 generated by the model registry 208 which has been previously discovered by the device discovery and management module 206. The kiosk application 220 communicates with peripheral devices as that abstracted level which allows the kiosk application to be shielded from needing to know or understand low level details about the device hardware. Each device model 210 may include specific information about the underlying hardware device 202. In one embodiment, the device model 210 includes device identifying information 602. The device identifying information 602 may include information such as the device model, the device manufacturer, the device firmware version (if known), the device driver version, and other information which may be used to identify the specific device.

The device model 210 may also include device status data 604. The device status data 604 may take the form of a status code which has been received from the event bus 204 via the device discovery and management module 206. Typically, the device status data include the code most recently received from the event bus 204. In some implementations, historical device code data may be stored with the device model 210. The device model 210 may further include device command data 606. The device command data 606 may include command codes which may be sent to the underlying physical device 202 associated with the device model 210 via the event bus 204, directly, or via the device management module 206 in order to allow the kiosk application 220 to control the physical hardware device.

Figure 7:
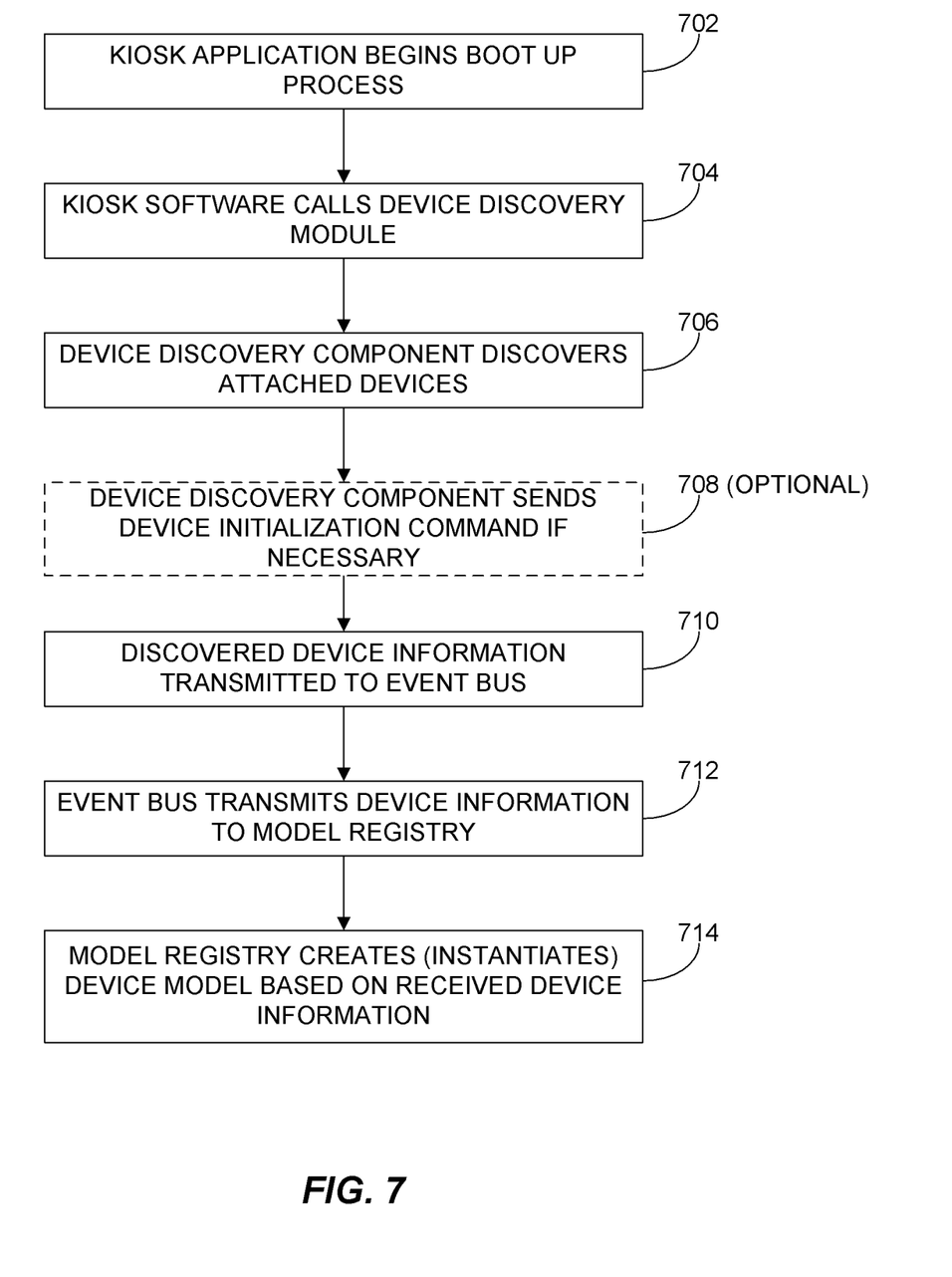
FIG. 7 is a flowchart illustrating a process by which devices are discovered and registered in the kiosk in accordance with one or more embodiments.

FIGS. 7-11 below are flowcharts which describe the various processes performed by the components in kiosk device management system 200. FIG. 7 is a flowchart illustrating a general process by which devices are initially discovered and registered in the kiosk in accordance with one or more embodiments.

The process begins at block 702, where the kiosk application 220 begins the boot up process. As noted above, the kiosk application is typically stored in a memory of the kiosk computer and is executed by a processor located in the kiosk computer. The kiosk application boot up process typically occurs when the kiosk is "turned on" so that it can be used in the field by customers. As part of the boot up process, the operating system on the kiosk computer loads into memory, and the kiosk application 220 begins execution.

Next, at block 704, the kiosk application 220 has been loaded into memory and the discovery sub-module 302 of the device discovery and management module 206 is called. At block 706, the discovery sub-module discovers (possibly using the loaded device drivers 203) the physical kiosk devices 202 which are operating within the kiosk system. As noted above, the device discovery sub-module may be configured to scan known device locations such as physical and virtual ports in the operating system of the kiosk computer to determine which kiosk devices are connected to the kiosk computer and working properly. The device discovery sub-module may also use a management protocol such as SNMP and UPnP, or some proprietary device discovery method to discover attached kiosk devices. The process then optionally moves to block 708 where the initialization sub-module 304 of the device discovery and management module 206 sends device initialization commands to the devices that it has discovered. This block is denoted as optional because, in some instances, the operating system of the computer may have also already initialized the devices making initialization commands unnecessary.

The process next moves to block 710 where the discovered device information is transmitted by the device discovery and management module 206 to the event bus 204 for processing. The event bus 204 receives the device information and then transmits it to the model registry 208 at block 712. The process then moves to block 714, where the model registry 208 creates a device model 210 based on the device information received from the event bus 204. As discussed above, the device model 210 generated by the model registry 208 is an abstracted representation of the physical device 202.

When the device models have been generated using the process of FIG. 7, the kiosk application 220 may then access the model registry 208 in order to access kiosk device services. As noted previously, the abstraction of the physical devices 202 into device models 210 allows for considerable flexibility in terms of how the kiosk application 220 interacts with the kiosk devices connected to the kiosk computer. The model registry 208 allows the kiosk application 220 to specify services that it needs, and the model registry 208 attempts to match the device model 210 which is capable of providing the requested service. If the optimal or "best" device for carrying out the request is not available, the model registry 208 may consider other device models 210 which may be able to carry out the kiosk application request. For example, if the primary receipt printer 114 in the kiosk has an error code status associated with it in the model registry, a secondary printing device, such as a printer available over the network, may be selected by the device registry 208.

Figure 8:
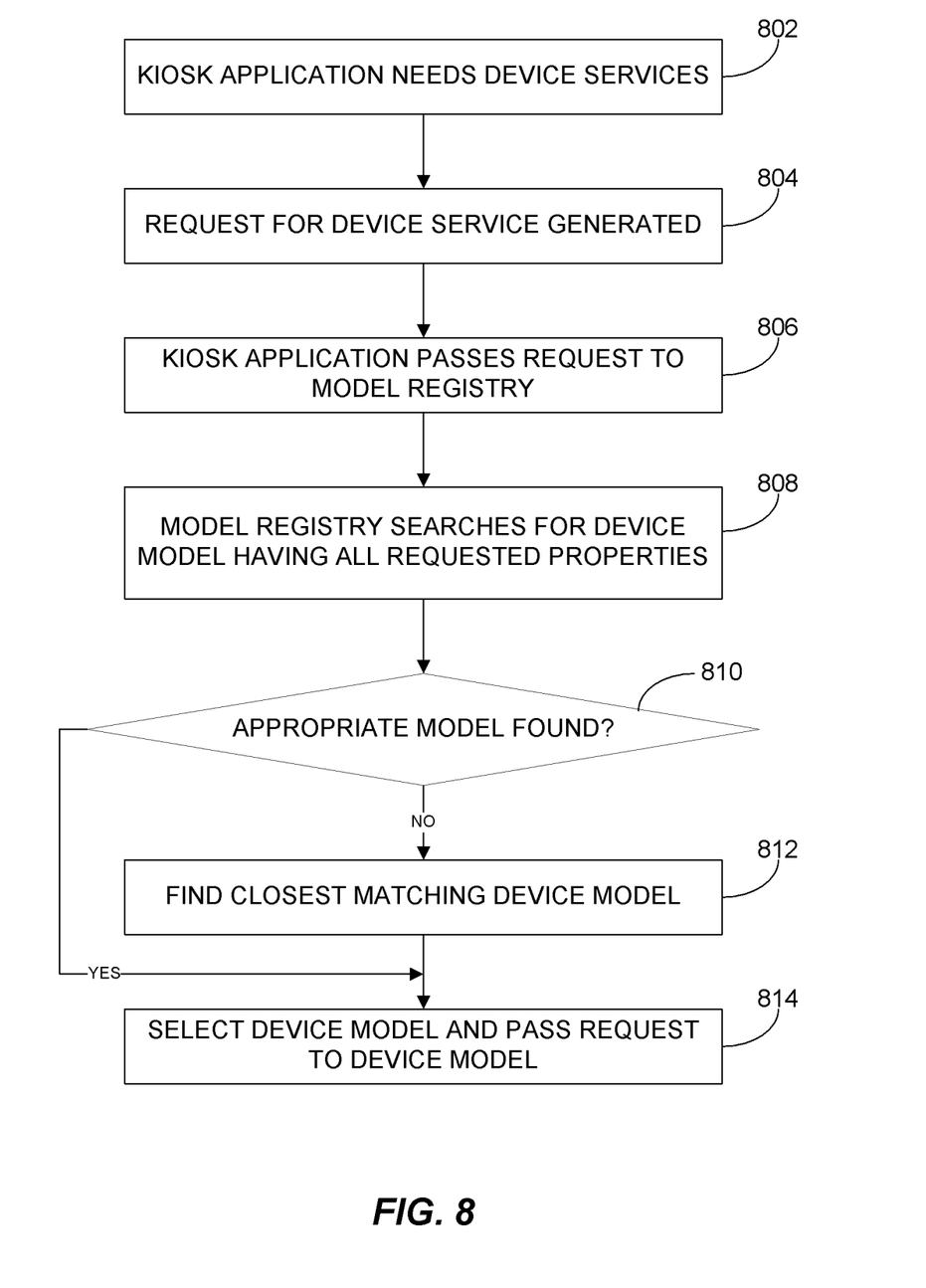
FIG. 8 is a flowchart illustrating a process by which the kiosk application may modify its operations based on messages received from the model registry.

FIG. 8 is a flowchart illustrating a process by which the model registry 208 is able to allocate a kiosk application 220 request to a secondary kiosk device. The process begins at block 802 where the kiosk application 220 executes a process which needs a particular service such as printing a receipt, for example. The process then moves to block 804, where the kiosk application generates a request for device services. This request for device services typically includes the type of service and any data that is associated with that service. For example in the case of printing a receipt, the kiosk application may send a "print" request to the event bus 204 along with the name of a file to be printed.

The process then moves to block 806, where the generated request is passed to the model registry 208. The model registry 208 receives the message from the event bus 204 and searches for a device model which has the requested properties at block 808. For example, if the kiosk application has requested the printing service, the model registry searches each device model in the registry to identify those devices capable of carrying out the request.

The process then moves to decision block 810, where it is determined whether an appropriate model 210 has been found in the model registry 208. If a device model 210 suitable for carrying out the kiosk application request is identified, then the process moves to block 814 where the device model 210 is selected and the kiosk application request is sent to the selected device model 210. If, at decision block 810, an appropriate model is not found, the process instead moves to block 812, where the closest matching device model is selected to carry out the kiosk application request.

For example, if the local printer in the kiosk system is unable to carry out the request, for instance, due to it being out of paper, the model registry 208 may have a secondary network printer that may be capable of carrying out the request. However, the network printer may not have the paper size specified by the print request. Even though the paper size is not optimal, the print request may be sent to the secondary printer to determine whether the print job can be successful or not.

In some embodiments, it is also possible to find that there is not a closely matching device model. In this instance, the kiosk application may be notified that no such device exists, and may then modify its process to work around the deficiency. Alternatively, the kiosk application may also simply go offline if the request cannot be fulfilled by any device model.

As noted above, one of the challenges facing effective kiosk implementation in a QSR environment is the fact that kiosk devices are often manufactured in small batches by various vendors resulting in slightly different configurations of kiosk devices over time. These slightly different configurations may include different firmware versions, for example. The different firmware versions might have slightly different device codes. Thus, when a particular model of a kiosk device is replaced with a newer version of the same model, the codes received by the model registry 208 from the device management sub-module may not be the codes that are expected for that type of device. In existing systems, these types of inconsistencies cause the kiosk device to raise an exception, and may cause the device to be unusable until the codes are updated. In some embodiments, the kiosk device management system 200 may include a learning component that allows it to handle situations such as these by inferring meaning of unknown codes based on defined behavior associated with those codes.

Figure 9:
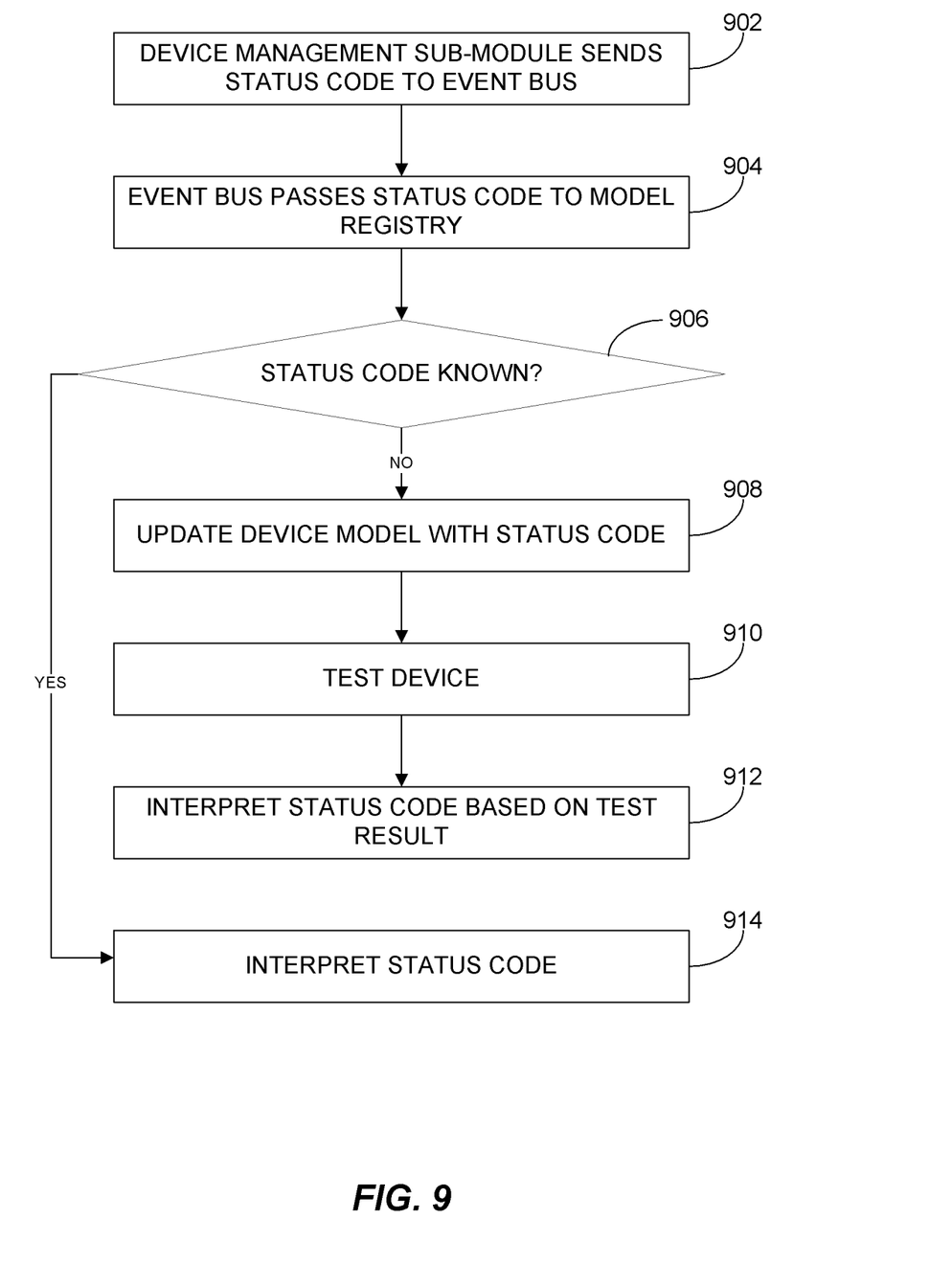
FIG. 9 is a flowchart of a process by which the kiosk device management system may infer the meaning of unknown status codes from a peripheral device in the kiosk.

FIG. 9 is a flowchart of a process by which the device management system 200 may infer the meaning of unknown status codes from a peripheral device in the kiosk 100. The process begins at block 902, where the device management component 302 of the device discovery and management module 206 obtains a status code from a kiosk device 202 and sends the status code to the event bus 204. Next, at block 904, the event bus 204 passes the status code to the model registry 208. At decision block 906, the model registry receives the status code and determines whether the code is a known code for that device model 210. If the code is known, the system operates normally and the status code is interpreted according to the data in the device model 210 and the status of the device model 210 is updated accordingly with the new status code.

If at decision block 906 the status code is not known or present in the device model 210, the model registry first updates the device model 210 with the new status code at block 908. The process next moves to block 910 where it tests the device. Once the device has been tested, the status code is then interpreted based on the result of the test at block 912. By way of example and not of limitation, if the device model 210 is for a printer, and the new status code is not recognized by the device registry, a test print may be sent to the printing device to determine whether it is operating properly. If the test print is successful, the status code may be then interpreted or inferred to mean that the printer device is functioning properly. In some embodiments, if the status code cannot be interpreted, the device may be set as being in an "UNKNOWN" status can be considered offline and unavailable to process requests.

Figure 10:
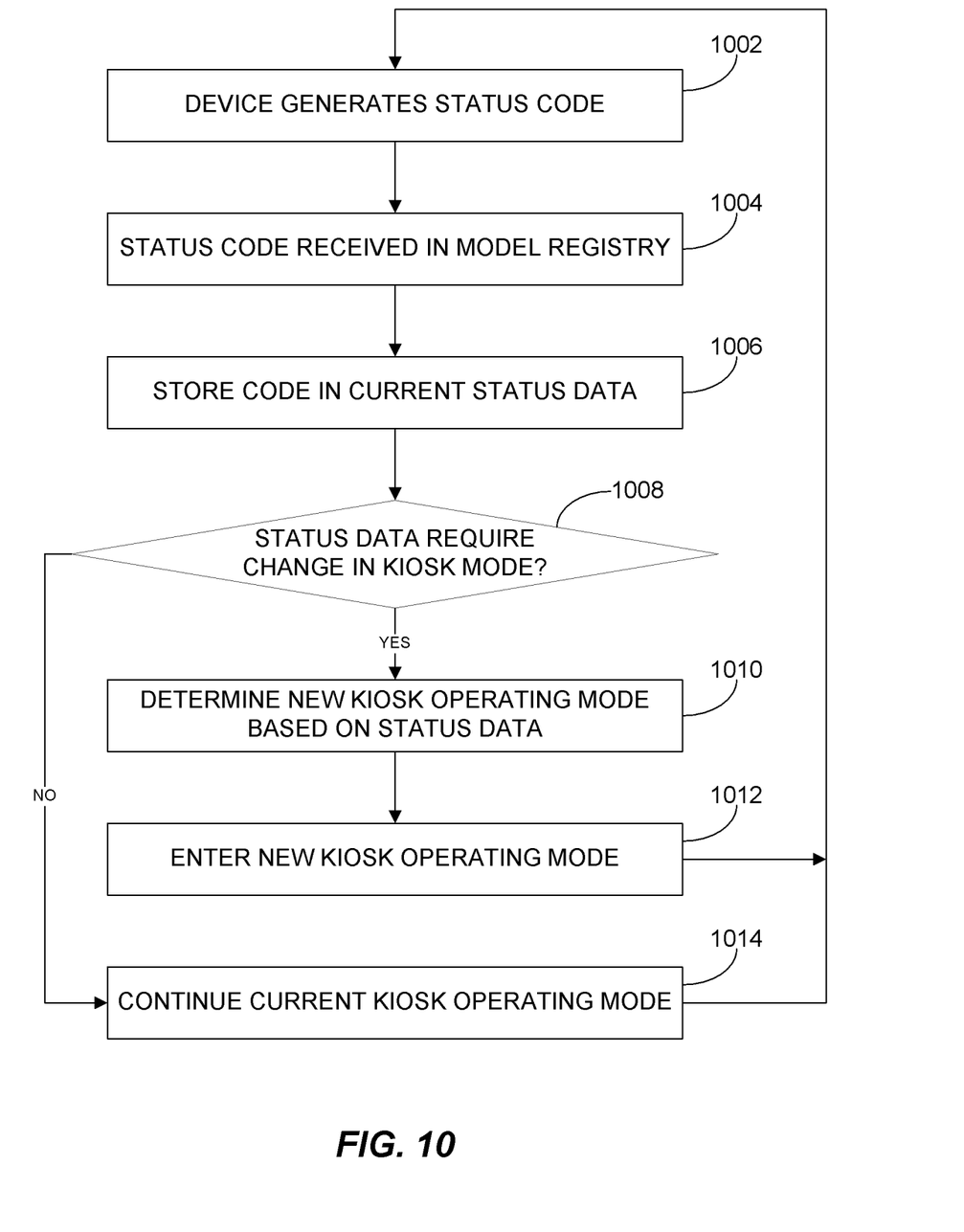
FIG. 10 is a flowchart of a process by which a kiosk may enter a lower function mode of operation based on information generated by the model registry.

In some embodiments, the kiosk device management system 200 may also be used to allow the kiosk to enter a lower function mode if certain kiosk devices are unavailable to prevent a negative impact on the customer ordering experience. FIG. 10 is a flowchart of a process by which a kiosk may enter a lower function mode of operation based on information generated by the model registry.

The process begins at block 1002 where a kiosk device 202 generates a device status code. The process then moves to block 1004, where the device status code for the kiosk device 202 is received by the model registry 208. As discussed above, the status code may be obtained from the kiosk device 202 by regularly polling the device 202 with the management sub-module 308 of the device discovery and management model 206. The result received by the management sub-module is then sent to the event bus 204 which it turns passes the data to the model registry 208.

Next, at block 1006, the status code obtained from the device 202 is stored in the status data 604 of the device model 210 that is associated with the device 202. The process then moves to decision block 1008, where the model registry 208 determines whether the device status 604 requires a change in the operating mode of the kiosk application. If no change in kiosk operating mode is required at block 1008, then the process moves to block 1014 and the kiosk remains in its current operating mode. The process then loops back to block 1002 and repeats.

If at decision block 1008 a change in the operating mode of the kiosk is required, the process moves instead to block 1010, where a new kiosk operating mode is determined based on the status data. Once the new mode has been determined, the process then moves to block 1012, where the kiosk enters the selected new operating mode. Once the new operating mode has been entered by the kiosk, the process loops back to block 1002 and begins again.

Thus, the process set forth in FIG. 10 allows the status of the kiosk devices to be continuously monitored by the kiosk device management system 200 and modify the kiosk's operating mode in response to events that occur in the kiosk devices 202. In some embodiments, the status of each device 202 is reported asynchronously to the kiosk system via the event bus 204, and the kiosk application 220 can react accordingly when it is convenient to do so, for example, at the beginning of a transaction and before a customer is engaged.

In one specific implementation of the process described in FIG. 10, the kiosk device management system may change the operating mode of the kiosk based on a low paper message received from a printer device 214 in the kiosk system. In some receipt printers, paper is delivered as a roll of paper. Because the size of orders differs from customer to customer, the length of a receipt printed by the kiosk device may be variable based on the content of the order. Thus, a low paper status code from the printing device may not mean that there are a specific number of receipts that may be printed due to the variable size of the receipts. Even though the paper in the printer may not be exhausted, it may be desirable to change the kiosk application into a "no print" mode so that no customer attempts to print a receipt only to find that there is no paper available.

Thus, in accordance with the process described in FIG. 10, the printer 202 may be initially sending a "normal function" code to the device model 210 representing the printer, and when the kiosk requests a print, the print job is sent by the printer model 210 to the printer device 202. However, if the printer becomes low on paper and a low paper message is sent to the model registry 208, the low paper status may trigger a change in the kiosk application mode to a "no print" mode prior to the next customer accessing the kiosk application 220. By changing the kiosk into a "no print" mode, the risk of an out of paper error occurring during a customer transaction is eliminated. Similarly, if the printer paper is replenished, the process described in FIG. 10 will ensure that the kiosk application 220 returns to its normal operating mode. Such decisions or business rules may be encapsulated in different models which can be configured. A single printing device may have more than one associated model. A "PrinterModel" may be provided which allows "PessimisticPrinterModel" which turns offline at first sign of low paper, allowing different customers to configure kiosk behaviors cleanly and quickly.

In still another embodiment, the kiosk application may change its cash handling mode based on status codes received from the various devices which are used to conduct payment transactions. For example, if the credit card swipe 116 is in an error condition detected by the model registry 208, the kiosk application 220 may be configured to operate in a "cash-only" mode until a device model 210 for the credit card processing device 116 indicates a normal operating condition.

Figure 11:
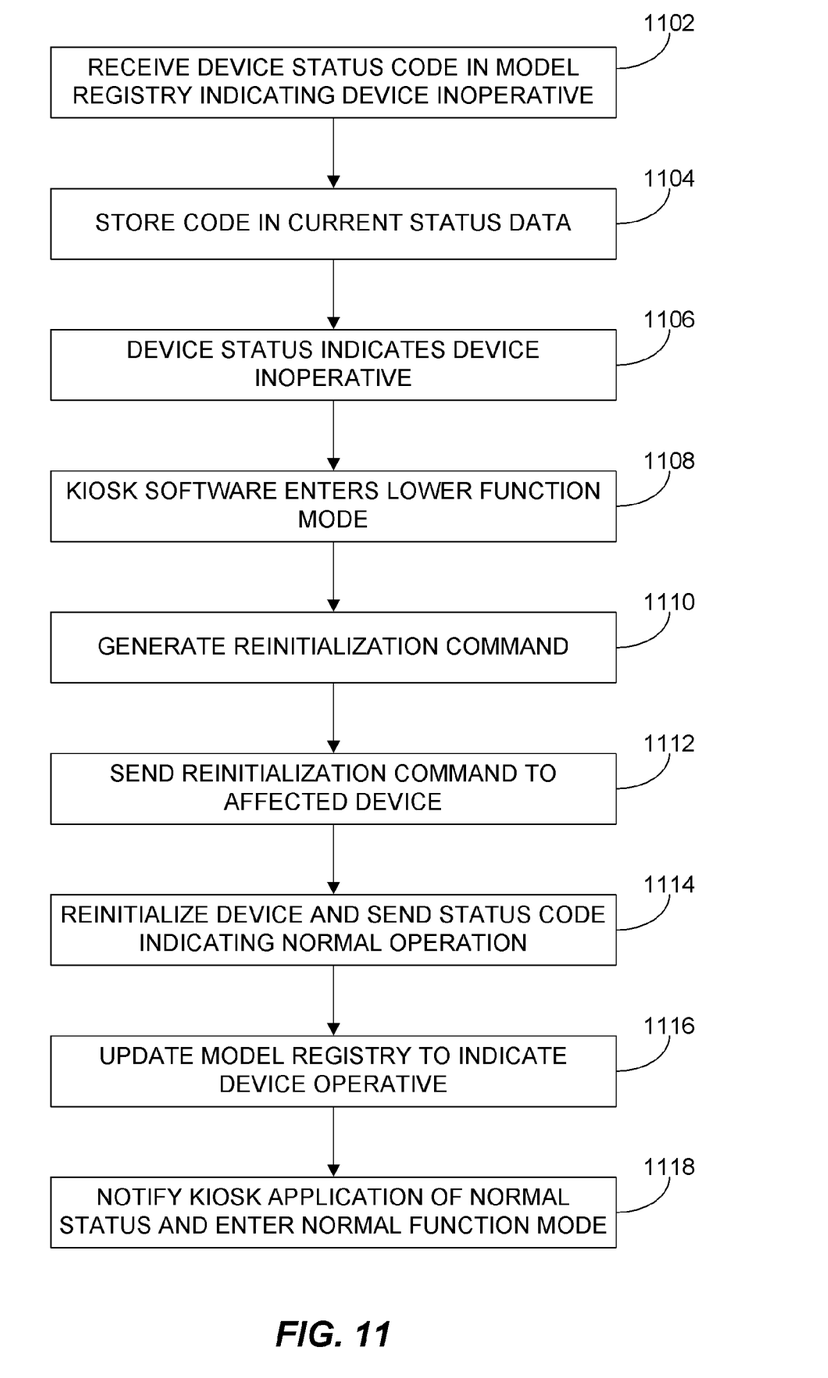
FIG. 11 is a flowchart of a re-initialization process in accordance with one or more embodiments.

In some additional embodiments, when an error condition is encountered in one or more kiosk devices 202, the kiosk device management system 200, in addition to modify the operating mode of the kiosk application 220, may also be configured to attempt to correct the error condition by re-initializing the device in such a way as to not adversely impact the customer ordering experience. FIG. 11 is a flowchart of a re-initialization process in accordance with one or more embodiments.

The process of FIG. 11 begins at block 1102, where a status code is received from a kiosk device 202 at the model registry 208. The received status code indicates that the device is in an error condition. The model registry 208 then stores the status code in the code data 604 of the appropriate device model 210 at block 1104, and the device status for the device model 210 indicates that the device is inoperative at block 1106. The process then moves to block 1108, where based on the status data 604 for the device model, the kiosk application 220 enters a lower function mode such as, for example, a "no-print" mode or "cash-only" mode described above. Next, at block 1110, the kiosk device management system 200 attempts to correct the error condition by generating a re-initialization command for the problem device 202. In one embodiment, this command may be generated by the model registry 208 and passed to the device 202 via the event bus 204, device management module 206, and device driver 203. Alternatively, the command may be generated by the initialization sub-module 306 of the device discovery and management module 206. At block 1114, the affected device is re-initialized and sends a status code indicating normal operation. Then, at block 1116, the model registry 208 and device model 210 are updated to indicate that the device is operating normally. A message indicating normal operation of the device is then passed via the event bus 204 to the kiosk application 220. The kiosk application receives the message and changes its operating mode back to the normal operating mode with respect to the kiosk device 202.

In some embodiments, the process shown in FIG. 11 may be carried out completely hidden from the kiosk customer. For example, while a customer is placing a food order using the kiosk, a printer failure message may be received in the device registry. While the customer continues to place the order, a background process in the kiosk application may place the application in a "no-print" mode, while the kiosk device management system 200 carries out the process of FIG. 11. There is no need to reinitialize the entire kiosk application 220, but rather only the specific device 202 which was affected is re-initialized by the system.

Those of skill will recognize that the various illustrative logical blocks, modules, circuits, and algorithm steps described in connection with the embodiments disclosed herein may be implemented as electronic hardware computer software or combinations of both. To clearly illustrate this interchangeability of hardware and software, various illustrative components, blocks modules, circuits, and steps have been described above generally in terms of their functionality. Whether such functionality is implemented as hardware or software depends upon the particular application and design constraints imposed on the overall system.

Skilled artisans may implement the described functionality in varying ways for each particular application, but such implementation decisions should not be interpreted as causing a departure from the scope of the present invention. The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CDROM, or any other form of storage medium known in the art. An exemplary storage medium is coupled to the processor such the processor can read information from and write information to, the storage medium. In the alternative, the storage medium may be integral to the processor.

The processor and the storage medium may reside in an ASIC. The ASIC may reside in a user terminal. In the alternative the processor and the storage medium may reside as discrete components in a user terminal.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the presently disclosed embodiment may be embodied within a form that does not provide all of the features and benefits set forth herein, as some features may be used or practiced separately from others. The scope of the invention is indicated by the appended claims rather than by the foregoing description. All changes, which come within the meaning and range of equivalency of the claims are to be embraced within their scope.

What is claimed is:

1. A kiosk device management system, comprising:
a device discovery module configured to discover a device connected to a computer and report the discovered device;
an event bus configured to receive a notification related to the discovered device from the device discovery module;
a model registry configured to receive information indicative of the discovered device from the event bus and generate a device model based on the received information; and
a device management module configured to receive status codes from the discovered device and send a command to the discovered device based on the received status code.

2. The system of claim 1, wherein the device model corresponds to the discovered device.

3. The system of claim 1, wherein the device management module is further configured to generate a re-initialization command if at least one of inactivity or recoverable failure in the discovered device is detected.

4. The system of claim 1, wherein the device management module is further configured to report the received status code to the event bus.

5. The system of claim 4, wherein the model registry is further configured to obtain the received status code from the event bus and modify the generated device model based at least in part on the status code.

6. The system of claim 1, wherein the generated device model is configured to communicate with a kiosk application running on the computer.

7. The system of claim 6, wherein the kiosk application provides a customer-operated quick service restaurant ordering interface.

8. The system of claim 6, wherein the kiosk application is configured to request device services from the device model.

9. The system of claim 6, wherein the kiosk application is configured to request device services from the model registry.

10. The system of claim 9, wherein the device model comprises device identifying information, a device status, and device commands.

11. The system of claim 10, wherein upon receiving the request for device services, the model registry is further configured to select the device model suitable for carrying out the request and passing the request to the selected device model.

12. The system of claim 11, wherein the device model is further configured to send a device command based on the request to the kiosk device corresponding to the device model.

13. A method of managing kiosk devices in a kiosk system, the method comprising:
discovering a plurality of devices connected to a computer in the kiosk system;
reporting information related to each of the plurality discovered devices to an event bus;
transmitting by the event bus the information related to each of the plurality of discovered devices to a model registry; and
generating a plurality of device models corresponding to each of the plurality of discovered devices based at least in part of the information related to each of the plurality of discovered devices.

14. The method of claim 13, wherein each of the plurality of device models comprises data indicative of properties of its corresponding device.

15. The method of claim 14, wherein the data indicative of properties of the corresponding device comprises device identifying information, device status information, and device command information.

16. The method of claim 15, further comprising:
receiving at the model registry a request for device services;
identifying a device model in the plurality of device models suitable for executing the request; and
sending the request to the identified device model.

17. The method of claim 16, further comprising:
selecting a portion of the device command information corresponding to the request; and
sending the selected portion of the device command information to the device.

18. The method of claim 17, further comprising executing by the device an instruction in accordance with the command information.

19. The method of claim 15, further comprising:
receiving at the model registry a request for device services, the request comprising requested properties;
identifying a device model in the plurality of device models having the requested properties; and
selecting one of the plurality of device models having some of the requested properties if no device is identified having each of the requested properties.

20. The method of claim 13, further comprising:
requesting by a device management module a device status from one of plurality the devices;
receiving device status data and transmitting the received device status data to the model registry; and
updating the device model corresponding to the device based at least in part on the device status data if the device status data is recognized by the model registry.

21. The method of claim 20, further comprising:
testing the device when the device status data is not recognized by the model registry; and
interpreting the device status data based at least in part on results of the device testing.

22. The method of claim 13, further comprising:
requesting by a device management module a device status from one of plurality the devices;
receiving device status data and transmitting the received device status data to the model registry; and
updating the device model corresponding to the device based on the device status data; and
selecting an alternative kiosk operating mode based on the updated device status data.

\* \* \* \* \*